(12) United States Patent
Nuennerich et al.

(10) Patent No.: US 9,388,901 B2
(45) Date of Patent: Jul. 12, 2016

(54) SUPPORT RING ARRANGEMENT FOR A HIGH-PRESSURE SEAL

(71) Applicants: Peter Nuennerich, Siegen (DE); Wilfried Knauf, Herdecke (DE); Peter Weber, Hagen (DE)

(72) Inventors: Peter Nuennerich, Siegen (DE); Wilfried Knauf, Herdecke (DE); Peter Weber, Hagen (DE)

(73) Assignee: UHDE HIGH PRESSURE TECHNOLOGIES GMBH, Hagen (DE)

( * ) Notice: Subject to any disclaimer, the term of this patent is extended or adjusted under 35 U.S.C. 154(b) by 0 days.

(21) Appl. No.: 14/371,841

(22) PCT Filed: Jan. 14, 2013

(86) PCT No.: PCT/EP2013/000091
§ 371 (c)(1),
(2) Date: Sep. 19, 2014

(87) PCT Pub. No.: WO2013/107626
PCT Pub. Date: Jul. 25, 2013

(65) Prior Publication Data
US 2015/0042048 A1 Feb. 12, 2015

(30) Foreign Application Priority Data
Jan. 20, 2012 (DE) .......................... 10 2012 001 004

(51) Int. Cl.
*F16J 15/00* (2006.01)
*F16J 15/02* (2006.01)
(Continued)

(52) U.S. Cl.
CPC *F16J 15/02* (2013.01); *F16J 13/02* (2013.01); *F16J 15/166* (2013.01)

(58) Field of Classification Search
CPC ............. F16J 13/02; F16J 13/04; F16J 13/08; F16J 13/10; F16J 15/166; F16J 15/3488
See application file for complete search history.

(56) References Cited

U.S. PATENT DOCUMENTS 3,071,386 A * 1/1963 Scannell ........................ 277/582
3,218,087 A * 11/1965 Hallesy ......................... 277/532
(Continued)

FOREIGN PATENT DOCUMENTS

EP 0867647 A2 9/1998
GB 1239154 A 7/1971

OTHER PUBLICATIONS

German Language International Search Report for International Patent Application No. PCT/EP2013/000091; Mailing date May 29, 2013.
(Continued)

*Primary Examiner* — Kristina Fulton
*Assistant Examiner* — Eugene G Byrd
(74) *Attorney, Agent, or Firm* — thyssenkrupp North America, Inc.

(57) ABSTRACT

The invention relates to a support ring arrangement for a high-pressure seal which is provided, along with said support ring arrangement, for an axially slidable or pivotable container closure ( ) mounted in a cylindrical section of a high-pressure container, said high-pressure seal radially sealing the cylindrical section of the high pressure container with the aid of said support ring arrangement, and a maximum pressure of up to 10,000 bar being exerted, by means of a fluid, onto said support ring arrangement and high-pressure seal. Said support ring arrangement comprises, when viewed from the fluid side,
 an axial fixture for the arrangement (6)
 a sealing ring (4) which lies on the container closure (1) and is radially prestressed,
 at least one support ring which has an end-face (7) on the side of the ring that is perpendicular to the container closure (1) axis,
 at least one support ring arrangement (8) being provided which consists of at least two molded parts that are contoured so as to support one another,
 said molded parts lying one against another and comprising, on the sides thereof that lie one against the other, conical counter faces (12) that are parallel to each other, and
 one of said parallel, conical counter surfaces (12) beginning at the end face (7).

12 Claims, 6 Drawing Sheets

(51) Int. Cl.
*F16J 13/02* (2006.01)
*F16J 15/16* (2006.01)

(56) References Cited

U.S. PATENT DOCUMENTS

| | | | |
|---|---|---|---|
| 3,258,151 A | | 6/1966 | Gasche |
| 3,300,225 A | * | 1/1967 | Shepler ................ 277/584 |
| 3,606,356 A | * | 9/1971 | Beroset ................. 77/589 |
| 3,718,338 A | * | 2/1973 | Traub ................... 277/584 |
| 3,765,690 A | * | 10/1973 | Sievenpiper ........... 277/556 |
| 4,143,586 A | * | 3/1979 | Zitting ................. 92/206 |
| 4,212,474 A | * | 7/1980 | Arai .................... 277/362 |
| 4,231,578 A | * | 11/1980 | Traub ................... 277/572 |
| 4,268,045 A | * | 5/1981 | Traub ................... 277/589 |
| 4,556,223 A | * | 12/1985 | VanLoon et al. ....... 277/584 |
| 4,570,944 A | | 2/1986 | Traub |
| 4,840,379 A | * | 6/1989 | Thoman, Jr. ........... 277/584 |
| 5,577,739 A | * | 11/1996 | Ciotola ................. 277/380 |
| 6,626,438 B2 | * | 9/2003 | Walden ................. 277/510 |
| 6,712,362 B2 | * | 3/2004 | Krappmann et al. .... 277/437 |
| 6,758,478 B1 | * | 7/2004 | Moreno ................. 277/584 |
| 6,776,419 B2 | * | 8/2004 | Antoun ................. 277/500 |
| 7,341,258 B2 | * | 3/2008 | Holt et al. ............. 277/584 |
| 7,793,944 B2 | * | 9/2010 | Otuka ................... 277/611 |
| 2003/0122322 A1 | * | 7/2003 | Tremoulet et al. ..... 277/630 |

OTHER PUBLICATIONS

English Translation of International Search Report for International Patent Application No. PCT/EP2013/000091; Mailing date May 29, 2013.

\* cited by examiner

SUPPORT RING ARRANGEMENT FOR A HIGH-PRESSURE SEAL

The present invention relates to a support ring arrangement for a high-pressure seal, the high-pressure seal including the support ring arrangement being provided for a container closure which can be pushed in or pivoted in axially and is mounted in a cylindrical part of a high-pressure container, the high-pressure seal sealing the cylindrical part of the high-pressure container radially with the aid of the support ring arrangement, and a maximum pressure of up to 10 000 bar being exerted by means of a fluid on the support ring arrangement and the high-pressure seal.

U.S. Pat. No. 4,570,944 relates to a seal arrangement for a pressure piston which can be moved to and fro, the seal arrangement consisting of a low-pressure seal ring, a cam ring and a high-pressure seal ring, whereby a pressure of up to approximately 350 bar is exerted on a fluid. All the rings which are mentioned here have a sealing action.

In the high-pressure treatment of products, the products are loaded in a high-pressure chamber by a high-pressure medium, treated at a pressure of up to 10 000 bar. Various forces such as compressive stress, tensile stress, etc. are exerted with a high loading frequency on a high-pressure seal. Furthermore, considerable expansion or compression of the container and container closure can occur, which lead, inter alia, to joints, gaps or other openings, into which the seal can creep or flow. Additional elements, such as support ring constructions, are therefore used, in order to close the gaps, etc. under pressure and therefore to support the high-pressure seal correspondingly.

The invention is therefore based on the problem of providing a support ring arrangement for a high-pressure seal which is intended for a container closure which can be pushed in or pivoted in axially and is mounted in a cylindrical part of a high-pressure container, the high-pressure seal sealing the cylindrical part of the high-pressure container radially with the help of the support ring arrangement, and a maximum pressure of up to 10 000 bar being exerted by means of a fluid on the support ring arrangement and the high-pressure seal.

The object is achieved by way of a support ring arrangement (8) for a high-pressure seal, the high-pressure seal including the support ring arrangement (8) being provided for a container closure (1) which can be pushed in or pivoted in axially and is mounted in a cylindrical part of a high-pressure container, the high-pressure seal sealing the cylindrical part of the high-pressure container radially with the aid of the support ring arrangement (8), and a maximum pressure of up to 10 000 bar being exerted by means of a fluid on the support ring arrangement (8) and the high-pressure seal (4, 5), having, as viewed from the fluid side, an axial fixing of the arrangement (6),
a sealing ring (4, 5) which bears on the container closure (1), the sealing ring (4, 5) being prestressed radially,
at least one support ring which has an end face (7) on its side which lies perpendicularly with respect to the axis of the container closure (1),
at least one support ring arrangement (8) being provided which consists of at least two shaped parts (2, 3) which are contoured so as to be supported against one another, the shaped parts bearing against one another, and having conical mating faces (12) which are parallel to one another on their sides which bear against one another, and
one of the parallel, conical mating faces (12) beginning on the end face (7).

A support ring arrangement (8) can in principle consist of as many shaped parts as desired, as long as its supporting action for high-pressure seals is achieved. The support ring arrangement (8) is expediently designed with two contoured shaped parts which are supported against one another. The shaped parts bear against one another, and they have conical mating faces (12) which are parallel to one another on their sides which bear against one another.

As a result of the construction such that the parts of the support ring arrangement (8) have conical faces which are parallel to one another on their sides which bear against one another, the parts of the support ring arrangement (8) can slide on one another and therefore prevent the formation of joints, gaps or other openings between the container closure (12) and container.

In order to prevent that parts of the sealing ring can flow or extrude into gaps which result from the widening, the parallel, conical mating face (12) begins on the end face (7). In this way, the sliding of the conical mating faces (12) which are parallel to one another on one another results in no gap.

At least one of the shaped parts can be formed by the container closure (1) itself. Said shaped part is supported on the other shaped part of the support ring arrangement (8) via parallel, conical mating faces (12).

One of the shaped parts can also be formed by a releasable component of the container closure (1). As long as the releasable component of the container closure (1) has the same property (parallel, conical mating faces), the releasable component will achieve the same effect. The releasable component can be formed, for example, by a ring which has parallel, conical mating faces.

The end face (7) of one of the shaped parts is arranged perpendicularly with respect to the axis of the container closure (1). Of course, the end face (7) can also assume a different form, such as can be arranged on average at 90±30° with respect to the axis of the container closure (1), for example.

The cone of the parallel, conical mating faces (12) can have a helix angle of from 40° to 80° with respect to the axis of the container closure (1). A transition region (11) is provided between the conical mating faces (12) which are parallel to one another, the transition region (11) being designed in such a way that, after the dissipation of pressure as before the build-up of pressure, the shaped parts bear against one another again as in the starting position.

For example, the transition region (11) can be slightly conical or curved, with the result that the shaped parts in the transition region (11) form an upwardly and a downwardly curved space, the transition region (11) also being able to assume any desired other shape, as long as it fulfills its function.

The transition region (11) can preferably be designed in such a way that the outer shaped part (3) and the inner shaped part (2) in the transition region (11) have faces which are parallel to one another. Said parallel faces can also be parallel to the axis of the container closure (1), the outer shaped part (3) meaning that part which is further remote from the axis of the container closure (1), and the inner shaped part (2) meaning that part which is closer to the axis of the container closure (1) than the outer shaped part (3).

Ideally, the outer shaped part (3) has an insertion bevel on the side which faces the sealing ring (4).

The support ring arrangement (8) can consist of more than two parts; here, the outer shaped part (3) (a ring) can in turn consist, for example, of two part rings which are assembled by said ring being configured with a slot (9) which extends radially in the circumferential direction and a cut-out which is continuous in the circumferential direction on the outer circumference, the slotted parts of the ring being held together in the cut-out by way of a tensioning apparatus (10). The tensioning apparatus (10) makes it possible for the slotted parts of the ring to be joined together again reliably after the dissipation of pressure.

The cut-out which is provided in the circumferential direction of the ring on the outer circumference can be designed differently depending on the tensioning apparatus (10). The cross section of the cut-out can assume, for example, a rectangular, round, oval shape or another geometry, in which the slotted parts of the ring can be held together by means of a tensioning apparatus (10).

The tensioning apparatus (10) can be, by way of example, a polymer or an elastomer ring. Moreover, a suitable wire cable or a winding of wire, rope or a spring clamp can serve as suitable elements for the tensioning apparatus (10).

An axial fixing of the arrangement (6) is provided. Said fixing can be formed by a ring/front ring.

At a pressure of up to 10 000 bar, both shaped parts (2, 3) should be composed of a high-strength alloy. It is advantageous if the outer shaped part (3) has a lower modulus of elasticity than the container and/or container closure (1).

At least one of the shaped parts is preferably composed of a copper alloy or a titanium alloy. At least one of the shaped parts is preferably composed of steel.

The high-pressure seal with support ring arrangement (8) is preferably fixed on the container closure (1).

FIG. 1b is an enlargement of the section A from FIG. 1a.

Figure 1A:
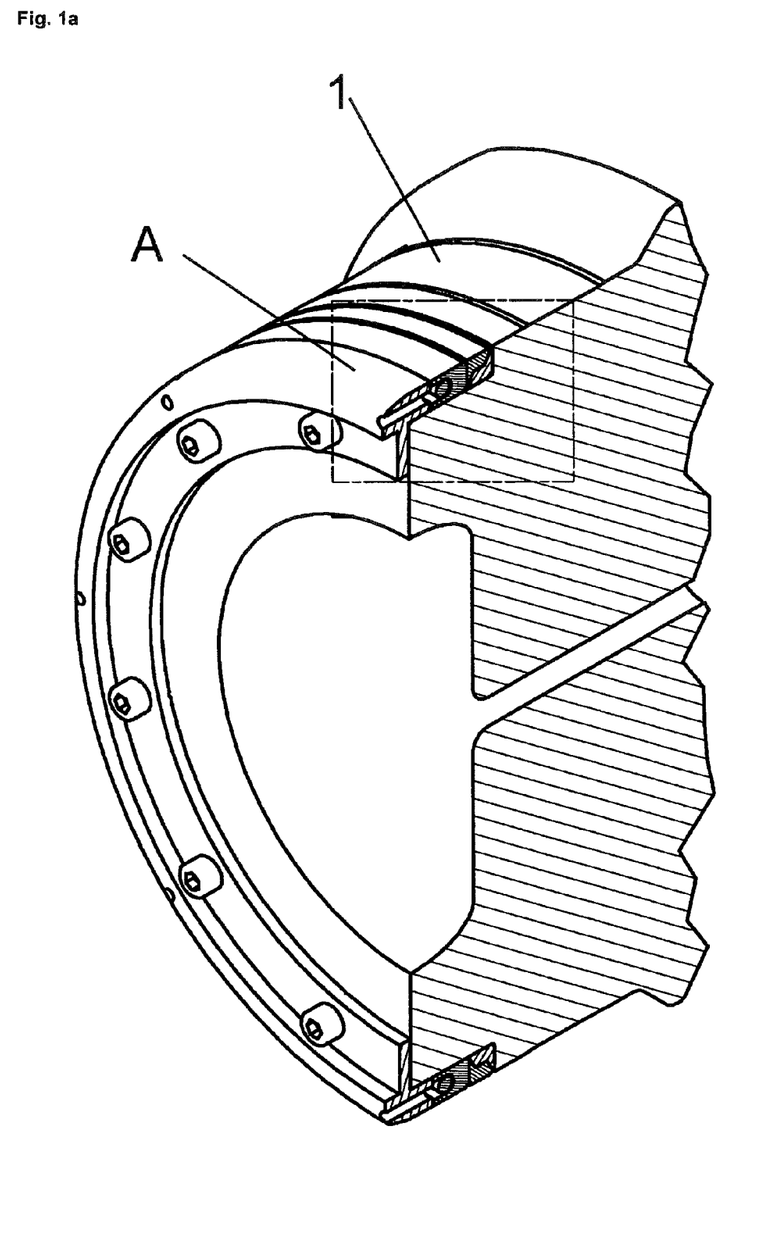
FIG. 1a shows the high-pressure seal with the support ring arrangement (8) on a container closure (1).
Figure 1B:
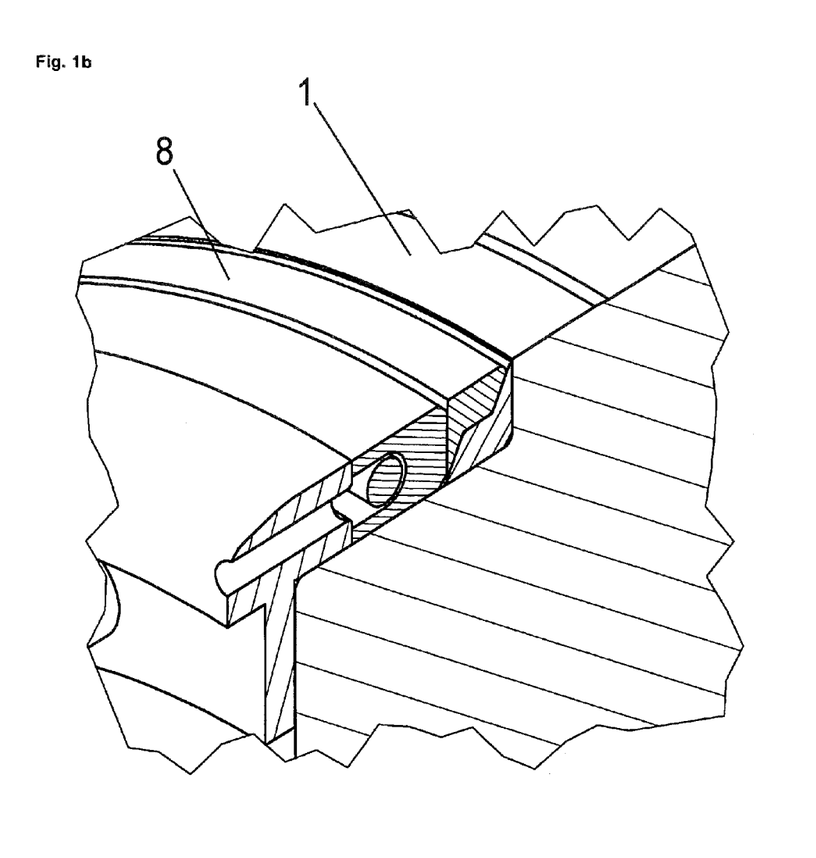
Figure 1C:
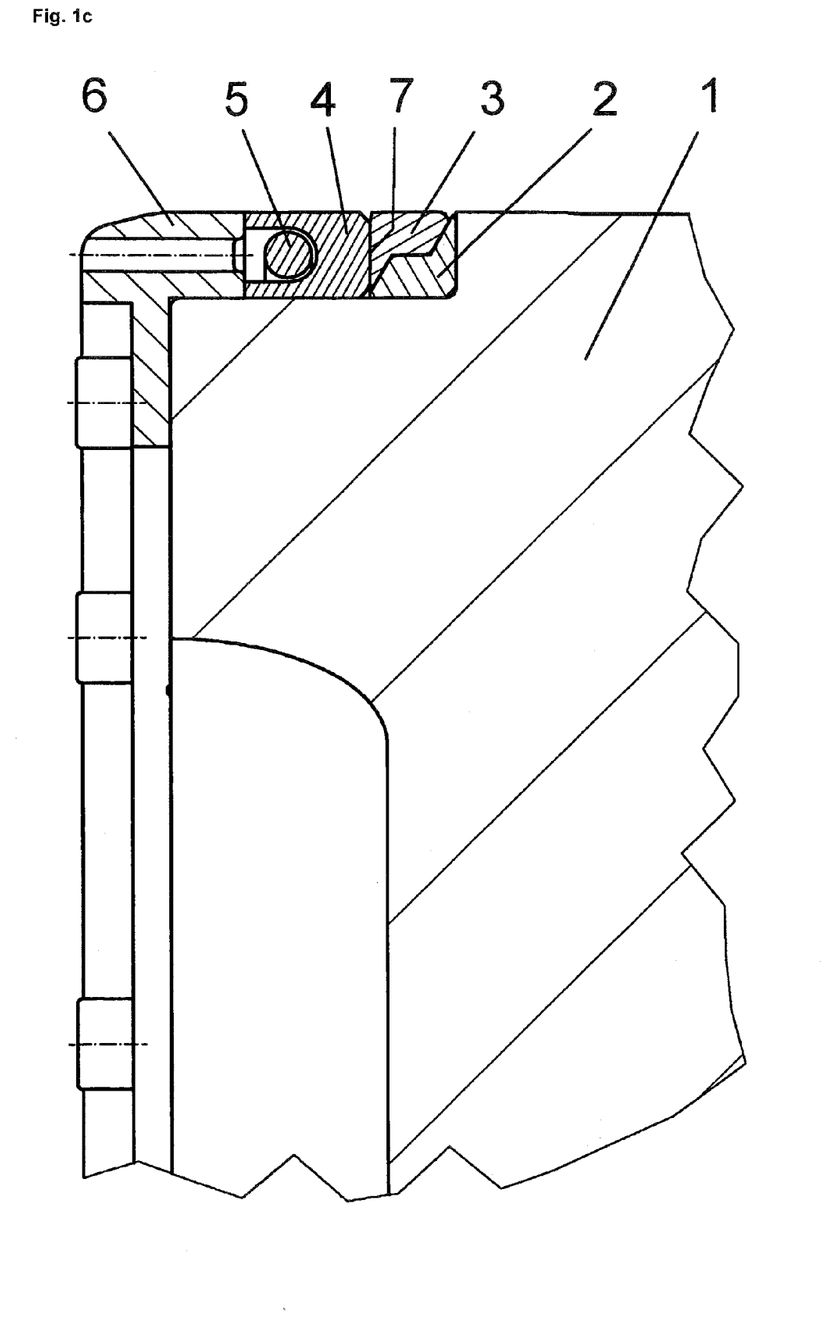
FIG. 1c is a detailed illustration of the high-pressure seal with the support ring arrangement (8).

FIG. 1a, 1b, 1c show the high-pressure seal and the support ring arrangement (8) on the container closure (1). As viewed from the fluid side, the high-pressure seal and the support ring arrangement (8) comprise a front ring (6), a sealing ring (4) which bears on the container closure (1), the sealing ring (4) having a groove with a C-shape, and the groove enclosing an O-ring (5). Bearing against the sealing ring (4), a support ring arrangement (8) is provided which consists of two part rings, an inner support ring (2) and an outer support ring (3). The two part rings bear against one another. The front ring (6) is provided with holes and fixing apparatuses. By means of the fixing apparatus on the front ring (6), the high-pressure seal and the support ring arrangement (8) are fastened axially on the container closure (1).

Figure 2:
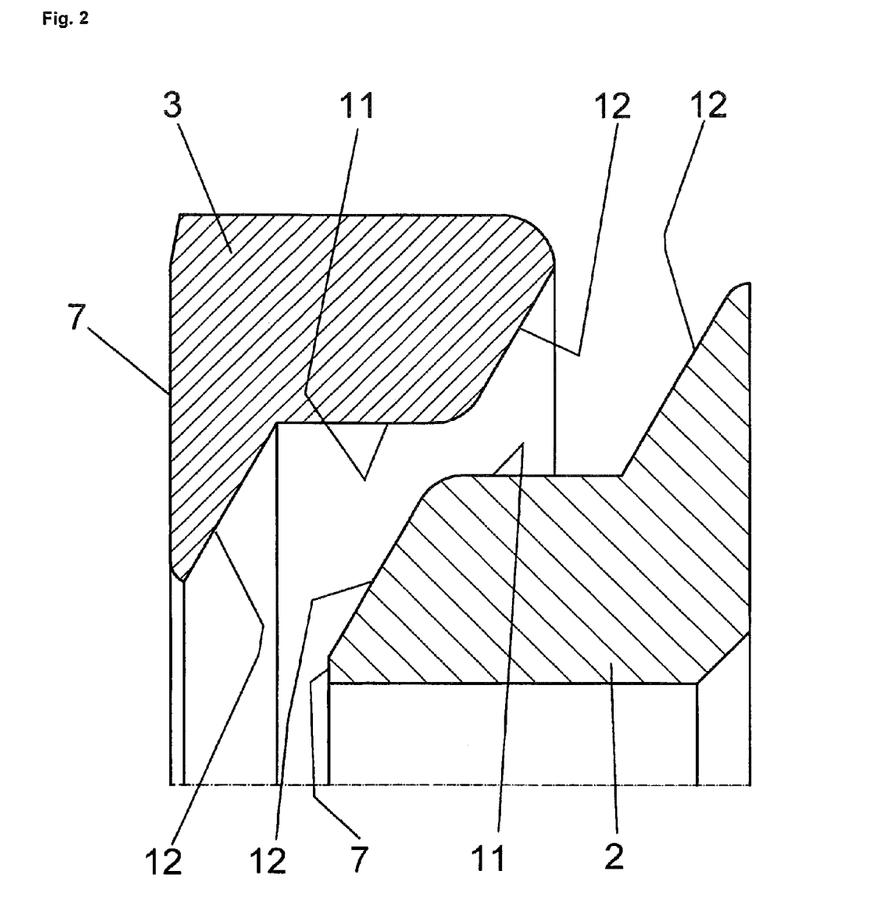
FIG. 2 shows the support ring arrangement (8) with the two part rings (2, 3).

In FIG. 2, the inner support ring (2)/the inner shaped part and the outer support ring (3)/the outer shaped part have faces (12) which are parallel to one another on their sides which bear against one another, and said parallel faces (12) begin on the end face (7), the inner support ring (2)/the inner shaped part and the outer support ring (3)/the outer shaped part in each case having a cone with an identical helix angle on their sides which bear against one another, and a transition region (11) is provided between the faces which are parallel to one another, the transition region (11) being designed in such a way that the inner support ring (2)/the inner shaped part and the outer support ring (3)/the outer shaped part in the transition region (11) have faces which are parallel to one another. As a result of this embodiment, the radial load is distributed over the ring width in an improved manner, and in addition the radial position in the pressureless state is defined precisely.

FIG. 2 shows merely one possible design for the support ring arrangement (8). However, the support rings can also be arranged in such a way that the end face (7) of the inner support ring (2)/the inner shaped part is arranged so as to bear against the sealing ring (4), and the end face (7) of the outer support ring (3)/the outer shaped part is arranged so as to bear against the container closure (1). This does not influence the supportive action of the assembled support ring arrangement (8).

Figure 3A:
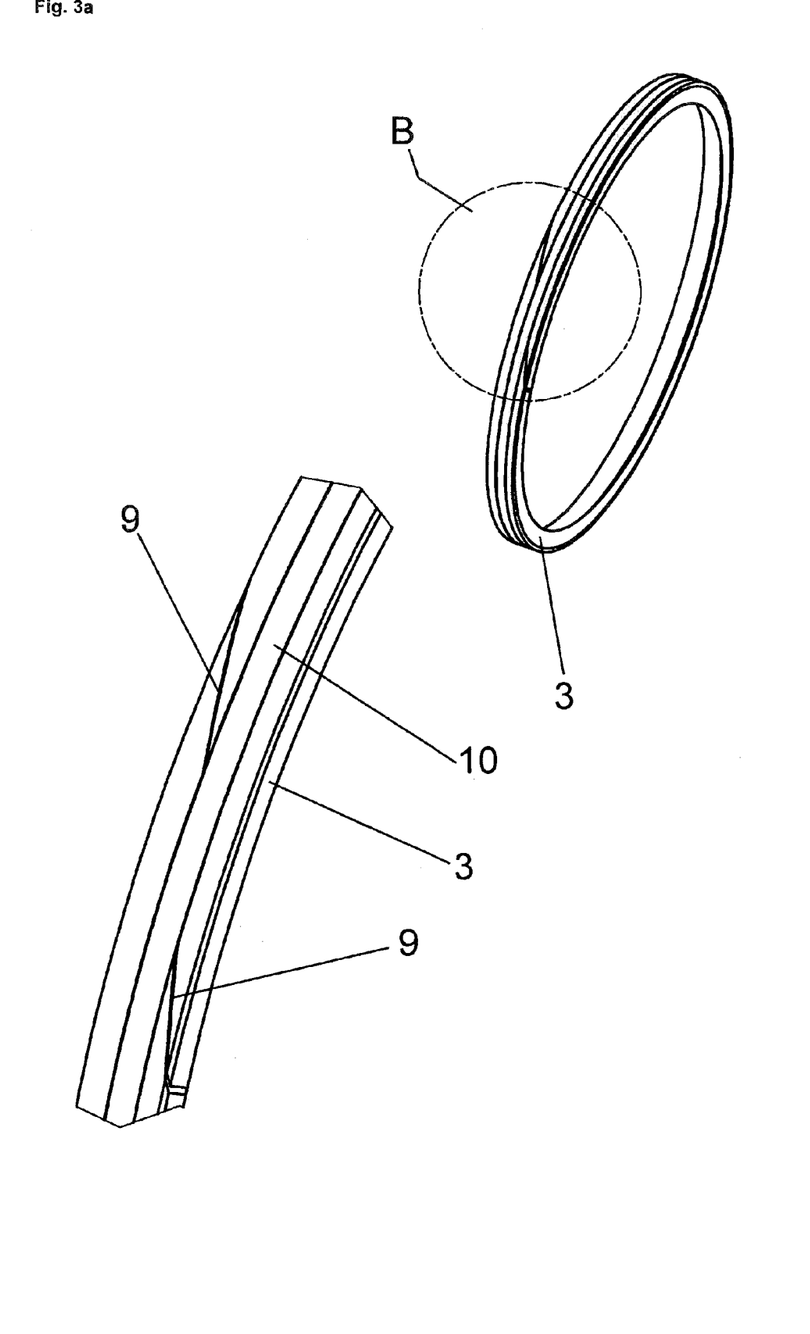
FIG. 3a shows a slotted outer ring.
Figure 3B:
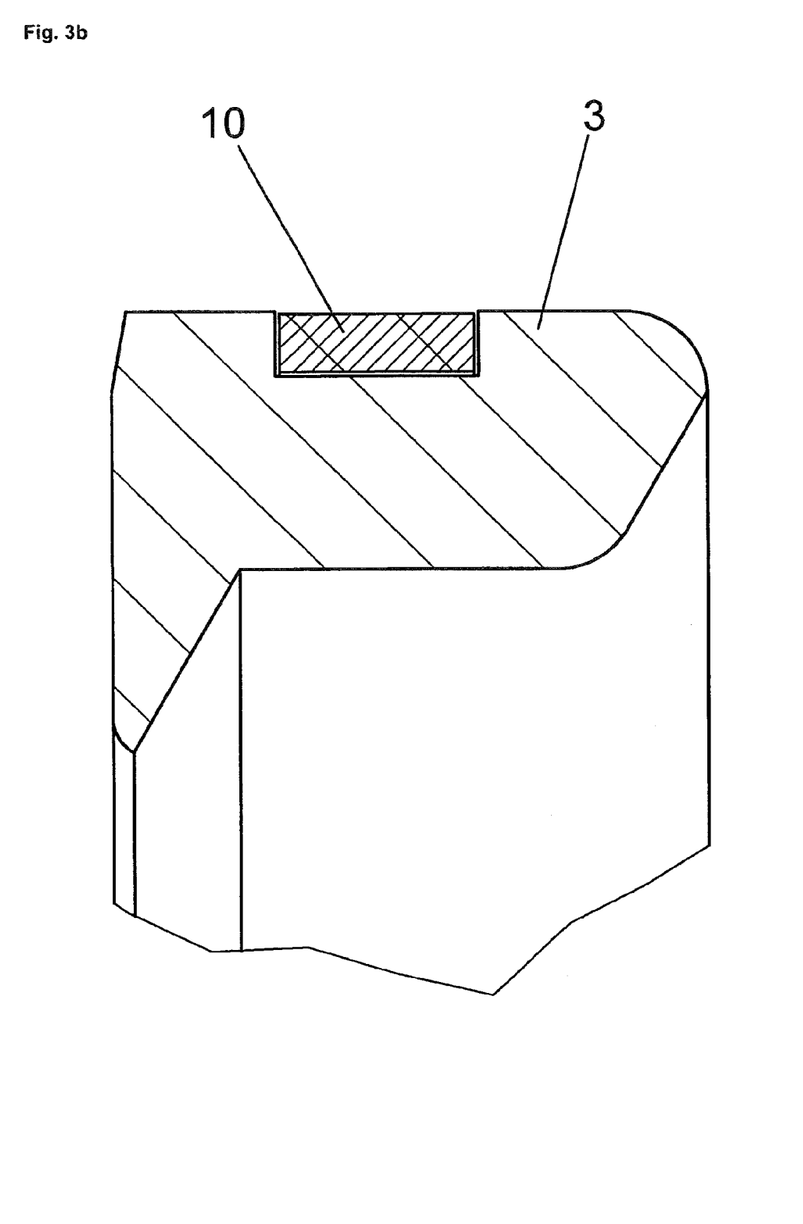
FIG. 3b shows the cut-out with the tensioning apparatus (10).

FIG. 3a, 3b show the slotted outer support ring (3)/the outer shaped part in different perspectives. FIG. 3a shows the enlargement of the slotted location (detail B) of the outer support ring (3)/the outer shaped part, the slot (9) extending radially in the circumferential direction. The tensile stress which acts on the outer support ring (3) is eliminated largely as a consequence of this embodiment.

A cut-out is provided in the circumferential direction of the outer support ring (3)/the outer shaped part on the outer circumference, in which cut-out the slotted parts of the outer support ring (3)/the outer shaped part are held fixedly by way of a tensioning apparatus (10), such as a polymer ring. FIG. 3b shows a possible cut-out including tensioning apparatus (10) with a rectangular cross section.

LIST OF DESIGNATIONS

1 Container closure
2 Inner support ring/inner shaped part
3 Outer support ring/outer shaped part
4 Sealing ring
5 O-ring
6 Axial fixing/front ring
7 End face
8 Support ring arrangement
9 Slot
10 Tensioning apparatus
11 Transition region
12 Parallel, conical mating face

The invention claimed is:

1. A non-sealing support ring system for providing support to a high-pressure seal that is configured to provide a radial seal between a cylindrical opening of a high-pressure container and a container closure, the container closure configured to be mounted in the cylindrical opening by one of being axially pushed or pivoted into the cylindrical opening, the support ring system comprising:
an outer ring part defining a first longitudinal central ring axis there through, said outer ring part having,
a first end face disposed at a first end of said outer ring part,
a first inner conical mating face disposed adjacent to and beginning at said first end face,
a second end defined opposite said first end,
a second inner conical mating face disposed adjacent to said second end, and
a first transition face disposed between said first conical mating face and said second conical mating face; and
an inner ring part that is complimentary to and mated with said outer ring part so as to be axially aligned therewith, said inner ring part having,
a first conical mating face that is parallel to and bears against said first conical mating face of said outer ring part,
a second conical mating face that is parallel to and bears against said second conical mating face of said outer ring part, a second transition face, disposed between said first and second conical mating faces of said inner ring part, which second transition face is parallel to said first transition face of said outer ring part and configured to axially center said outer ring part on said transition face of said inner ring part when said container is not under pressure and said support ring system is not subjected to an axial force that would otherwise be caused by pressure within the container, wherein said outer and inner ring parts are configured to be mounted onto the container closure adjacent the high-pressure seal, and force said outer ring part to expand to close off a radial gap disposed between the container closure and an inner surface of the container when subjected to an axial pressure of up to 10,000 bar so as to prevent the high-pressure seal from being forced by the axial pressure into the radial gap.

2. The support ring system of claim 1, wherein said inner ring part is integrally formed with the container closure.

3. The support ring system of claim 1, wherein said inner ring part is configured to be releasably coupled to the container closure.

4. The support ring system of claim 1, wherein said first end face of said outer ring part is oriented perpendicular to said longitudinal central ring axis.

5. The support ring system of claim 1, wherein said first end face of said outer ring part is oriented at an angle of between 60° and 120° with respect to said longitudinal central ring axis.

6. The support ring system of claim 3, wherein said conical mating faces of said outer and inner ring parts have a cone half angle of between 40° and 80° with respect to said longitudinal central ring axis.

7. The support ring system of claim 1, wherein said outer and inner ring parts are configured such that, prior to and after the support ring system is subjected to axial force caused by pressure within the container, said outer and inner ring parts bear against one another, at least at said first and second transition faces.

8. The support ring system of claim 1, wherein
at least one of said outer or inner ring parts defines a continuous cutout disposed circumferentially in an outer circumferential surface thereof, and further defines a through slot extending radially through said ring part in at least a partial circumferential direction so as to fully cut through said ring and define a non-continuous ring having opposing ring ends,
said support ring system further comprising a tensioning apparatus disposed in said continuous cutout of said ring part and configured to bias said opposing ring ends of said ring part towards each other.

9. The support ring system of claim 1, wherein at least one of said outer ring part or said inner ring part is made of a high-strength metal alloy and has a lower modulus of elasticity than the container and the container closure.

10. The support ring system of claim 9, wherein at least one of said outer ring part or said inner ring part is made of one of a copper alloy or a titanium alloy.

11. The support ring system of claim 9, wherein at least one of said outer or inner ring parts is made of steel.

12. The support ring system of claim 1, wherein the support ring system is configured to be affixed, together with the high-pressure seal, to the container closure.

* * * * *